(12) United States Patent
Furuta

(10) Patent No.: US 11,796,744 B2
(45) Date of Patent: Oct. 24, 2023

(54) OPTICAL FIBER FERRULE POLISHING HOLDER AND OPTICAL FIBER FERRULE POLISHING DEVICE

(71) Applicant: SEIKOH GIKEN Co., Ltd., Matsudo (JP)

(72) Inventor: Naoto Furuta, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 0 days.

(21) Appl. No.: 17/750,396

(22) Filed: May 23, 2022

(65) Prior Publication Data
US 2022/0390686 A1 Dec. 8, 2022

(30) Foreign Application Priority Data

Jun. 8, 2021 (LU) .................................. 2021-95618

(51) Int. Cl.
*G02B 6/38* (2006.01)

(52) U.S. Cl.
CPC ......... *G02B 6/3863* (2013.01); *G02B 6/3825* (2013.01)

(58) Field of Classification Search
CPC .. B24B 19/226; G02B 6/3825; G02B 6/3863; G02B 6/3879; G02B 6/3885; G02B 6/403; G02B 6/406
See application file for complete search history.

(56) References Cited

U.S. PATENT DOCUMENTS

| | | | |
|---|---|---|---|
| 4,819,386 A * | 4/1989 | Struyf | B24B 19/226 451/28 |
| 5,201,148 A | 4/1993 | Rupert et al. | |
| 6,547,653 B2 * | 4/2003 | Yamada | B24B 41/067 451/364 |
| 6,554,485 B1 * | 4/2003 | Beatty | G02B 6/3849 385/72 |
| 2001/0055459 A1 | 12/2001 | Yamada et al. | |
| 2003/0104775 A1 | 6/2003 | Yamada et al. | |
| 2006/0229006 A1 | 10/2006 | Yamada et al. | |
| 2018/0088283 A1 | 3/2018 | Taira et al. | |
| 2018/0088288 A1 | 3/2018 | Taira et al. | |
| 2020/0156208 A1 | 5/2020 | Wong | |

FOREIGN PATENT DOCUMENTS

| | | |
|---|---|---|
| DE | 102017102887 A | 6/2018 |
| JP | H04-130303 A | 5/1992 |
| JP | 4464535 B | 5/2010 |
| JP | 2018-10274 A | 1/2018 |

* cited by examiner

*Primary Examiner* — Omar R Rojas
(74) *Attorney, Agent, or Firm* — Yokoi & Co., U.S.A.; Toshiyuki Yokoi

(57) ABSTRACT

An optical fiber ferrule polishing holder for suppressing difference of protruded lengths of optical fiber ferrules protruded from the optical fiber ferrule polishing holder and difference of angles of the optical fiber ferrules. Even when force is applied to cables connected to the optical fiber ferrules, polishing performance of connectors is less affected. An optical fiber ferrule polishing holder for holding an optical fiber ferrule incorporated in a connector, including: a holder body having a plate shape; and an adapter fixed to the holder body so that the connector is locked to the adapter, wherein the holder body includes an insertion hole into which the optical fiber ferrule is inserted, and an upper surface of the holder body presses the optical fiber ferrule at a peripheral position of the insertion hole to contract a spring built in the connector when the connector is locked to the adapter.

12 Claims, 16 Drawing Sheets

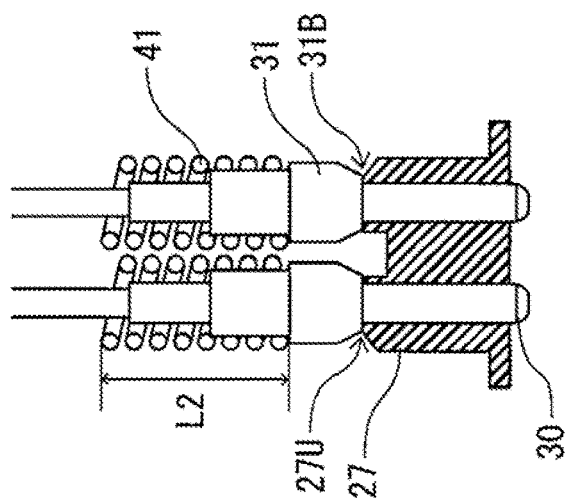
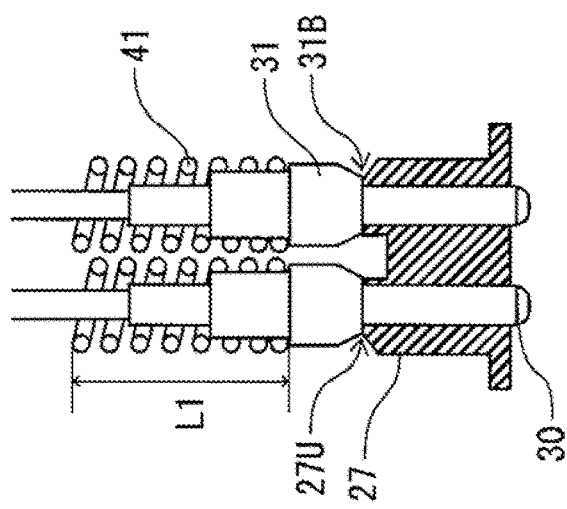
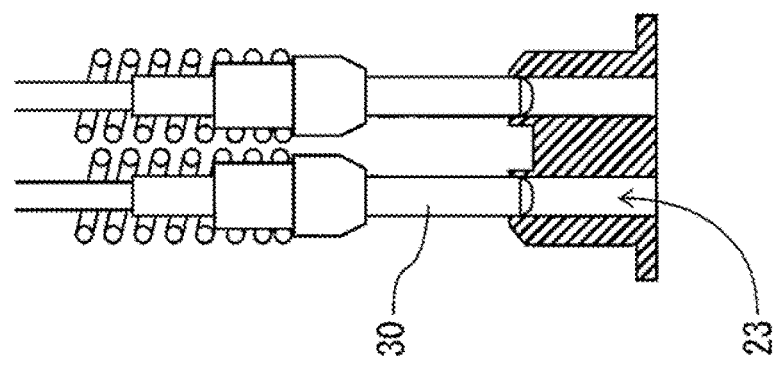

OPTICAL FIBER FERRULE POLISHING HOLDER AND OPTICAL FIBER FERRULE POLISHING DEVICE

CROSS-REFERENCES TO RELATED APPLICATIONS

This patent specification is based on Japanese patent application, No. 2021-95618 filed on Jun. 8, 2021 in the Japan Patent Office, the entire contents of which are incorporated by reference herein.

BACKGROUND OF THE INVENTION

1. Field of the Invention

The present invention relates to an optical fiber ferrule polishing holder for holding an optical fiber ferrule incorporated in a connector when polishing the optical fiber ferrule by an optical fiber ferrule polishing device and related to the optical fiber ferrule polishing device.

2. Description of Related Art

When polishing the optical fiber ferrule incorporated in the connector by the optical fiber ferrule polishing device, a plurality of connectors is locked to each of a plurality of adapters fixed to the optical fiber ferrule polishing holder. In that state, the optical fiber ferrule polishing holder is attached to the optical fiber ferrule polishing device and a plurality of optical fiber ferrules is simultaneously polished by the optical fiber ferrule polishing device.

At this time, if the protruded lengths of the tips of the optical fiber ferrules protruded from a lower surface of the optical fiber ferrule polishing holder are different in the plurality of optical fiber ferrules, misalignment of radius of curvature, axis deviation and angle deviation may occur and polishing performance is affected. Thus, it is not preferable. In Patent Document 1, in an optical fiber ferrule polishing holder, an energizing structure realized by coil springs is provided on the adapters for fixing the connectors to a holder body. Thus, difference of the protruded lengths of the optical fiber ferrules protruded from the lower surface of the optical fiber ferrule polishing holder is reduced by energizing the connectors using the coil springs.

[Patent Document 1] Japanese Patent No. 4464535

BRIEF SUMMARY OF THE INVENTION

The optical fiber ferrule polishing holder of Patent Document 1 has the structure of energizing the connectors using the coil springs. Thus, the above described structure allows the connectors to move in the adapters. Therefore, when the force of bending the cables connected to the connectors is added, the connectors are subject to the influence of the force added to the cables (e.g., the connectors are inclined in the adapters). When the force is added to the connectors and the connectors are inclined, the protruded lengths of the optical fiber ferrules protruded from the lower surface of the optical fiber ferrule polishing holder and the angles of the optical fiber ferrules are not constant in a plurality of optical fiber ferrules.

The present invention provides an optical fiber ferrule polishing holder and an optical fiber ferrule polishing device using the holder capable of suppressing the difference of the protruded lengths of the optical fiber ferrules protruded from the lower surface of the optical fiber ferrule polishing holder and the difference of the angles of the optical fiber ferrules in a plurality of optical fiber ferrules without providing coil springs in the adapters. Furthermore, even when the force is applied to the cable connected to the optical fiber ferrules, the polishing performance of the connectors is less affected.

The present invention is an optical fiber ferrule polishing holder for holding an optical fiber ferrule incorporated in a connector, including: a holder body having a plate shape; and an adapter fixed to the holder body so that the connector can be locked to the adapter, wherein the holder body includes an insertion hole into which the optical fiber ferrule can be inserted, and an upper surface of the holder body presses the optical fiber ferrule at a peripheral position of the insertion hole to contract a spring built in the connector when the connector is locked to the adapter.

In the above described configuration, it is also possible that the upper surface of the holder body contacts an abutting portion provided on a periphery in a radial direction of the optical fiber ferrule at the peripheral position of the insertion hole and presses the optical fiber ferrule to contract the spring built in the connector when the connector is locked to the adapter.

In the above described configuration, it is also possible that the abutting portion is a flange provided on the periphery in the radial direction of the optical fiber ferrule.

In the above described configuration, it is also possible that the holder body includes a protrusion protruded upward from the upper surface of the holder body at the peripheral position of the insertion hole, and the upper surface of the protrusion is configured to press the ferrule to contract the spring built in the connector.

In the above described configuration, it is also possible that a thickness of the holder body from a lower surface of the holder body to the upper surface of the holder body at the peripheral position of the insertion hole is 3.8 mm to 4.4 mm.

In the above described configuration, it is also possible that an upper end of the insertion hole is chamfered by 0.05 mm or more.

In the above described configuration, it is also possible that an outer shape of the upper surface of the protrusion includes a circular shape, and an outer diameter of the circular shape is 1.4 mm to 2.5 mm.

In the above described configuration, it is also possible that an outer shape of the upper surface of the protrusion includes a circular shape, and a ratio of the outer diameter of the circular shape with respect to the outer diameter of the optical fiber ferrule is 1.12 to 2.00.

In the above described configuration, it is also possible that the insertion hole includes a plurality insertion holes, and the plurality of insertion holes is arranged in a circular shape on the holder body.

In the above described configuration, it is also possible that the optical fiber ferrule polishing holder is used for the connector into which two or more optical fiber ferrules are incorporated at two or more positions, the upper surface of the holder body presses the optical fiber ferrule at the peripheral position of the insertion hole of the two or more positions to contract the spring built in the connector for each of the two or more of optical fiber ferrules when the connector is locked to the adapter, and a thickness of the holder body from a lower surface of the holder body to the upper surface of the holder body is same in the two or more positions.

In the above described configuration, it is also possible that the insertion hole is inclined by a predetermined angle with respect to a vertical direction, and the upper surface of the holder body is orthogonal to an axial direction of the insertion hole at the peripheral position of the insertion hole.

By using the optical fiber ferrule polishing holder of the present invention, even when the force is applied to the cables connected to the optical fiber ferrules, the influence to the polishing performance of the connectors can be reduced.

BRIEF DESCRIPTION OF THE DRAWINGS

FIGS. 7A to 7C are cross-sectional views schematically showing a configuration of pressing optical fiber ferrules 30 by an upper surface 27U of a protrusion 27.

DETAILED DESCRIPTION OF THE INVENTION

Hereafter, embodiments of the present invention will be explained with reference to the drawings shown as an example. In the present embodiment, an optical fiber ferrule polishing holder on which MDC (dual-core) connectors are arranged in a circular shape is used for the explanation. However, the type and the arrangement of the connectors are not limited to the above described configuration. The type of the connector is not limited to the MDC connector. The present invention can be also applied to an LC connector and other connectors. Note that the dual-core means that two optical fiber ferrules are incorporated in one connector at two positions. The present invention can be similarly applied to a single-core connector where one optical fiber ferrule is incorporated in one connector and a multicore connector where three or more plural optical fiber ferrules are incorporated in one connector at three or more plural positions. The arrangement of a plurality of connectors on the optical fiber ferrule polishing holder is not limited to a circular shape. The present invention can be similarly applied to the optical fiber ferrule polishing holder on which a plurality of connectors is linearly or randomly arranged.

Figure 1:
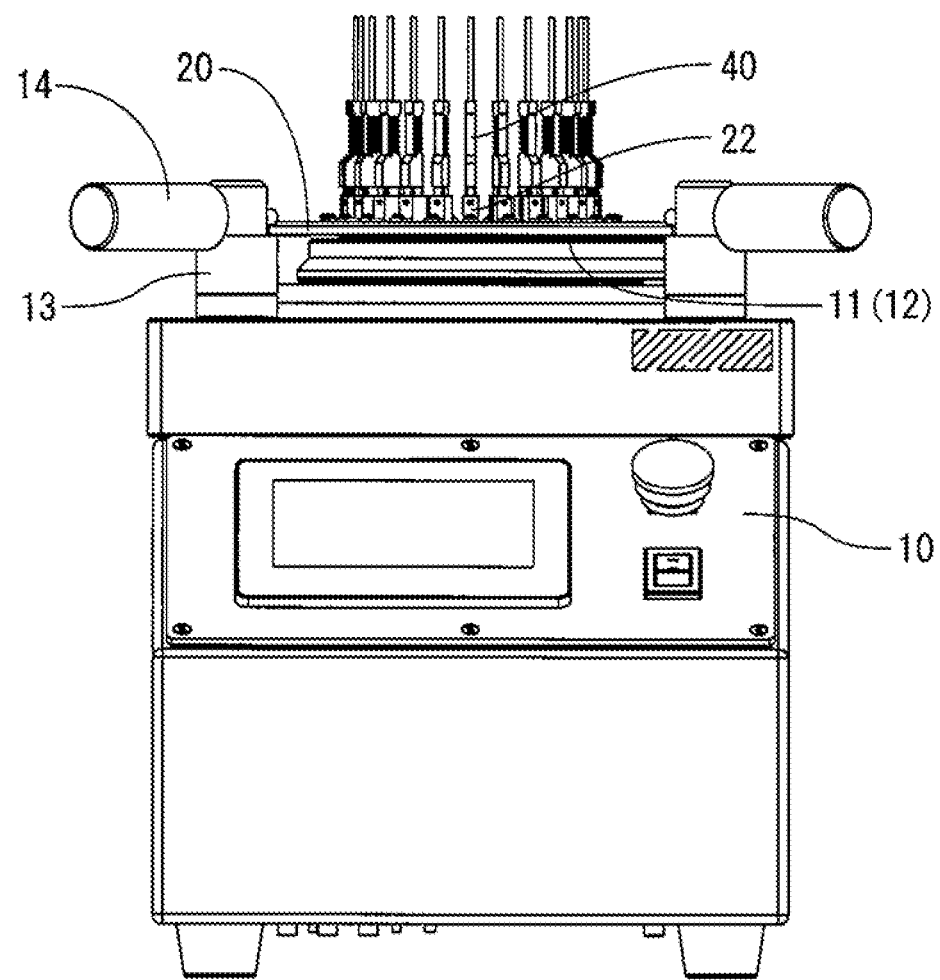
FIG. 1 is a front view showing an optical fiber ferrule polishing device 10 to which an optical fiber ferrule polishing holder 20 is attached in a state that connectors 40 are locked to the optical fiber ferrule polishing holder 20.

FIG. 1 is a front view showing a state that an optical fiber ferrule polishing holder 20 (hereafter, holder 20) is attached to an optical fiber ferrule polishing device 10 (hereafter, polishing device 10). A polishing pad 11 is arranged on an upper surface of the polishing device 10. A polishing film 12 is arranged on an upper surface of the polishing pad 11. An optical fiber ferrule 30 (hereafter, a ferrule 30, shown in FIG. 6) is incorporated in a connector 40. A plurality of connectors 40 is attached to the holder 20. Thus, the holder 20 can hold a plurality of ferrules 30. The polishing device 10 is operated in a state that the plurality of connectors 40 is attached to the holder 20. The upper surface (polishing film 12) of the polishing device 10 is pressed against the tips of the ferrules 30 and moved relatively to the ferrules 30. Thus, end surfaces of the ferrules 30 are polished by the surface of the polishing film 12. When the plurality of connectors 40 is attached to the holder 20, the plurality of ferrules 30 can be simultaneously polished.

Holding bases 13 for holding the holder 20 are provided on four corners of the upper part of the polishing device 10. A clamp lever 14 is provided on each of the holding bases 13. The holder 20 is placed on the holding bases 13 and the clamp levers 14 are horizontally rotated. Thus, the holder 20 can be fixed to the polishing device 10. Since the polishing device 10 has a conventional structure, the detailed explanation of the polishing device 10 is omitted.

Figure 2:
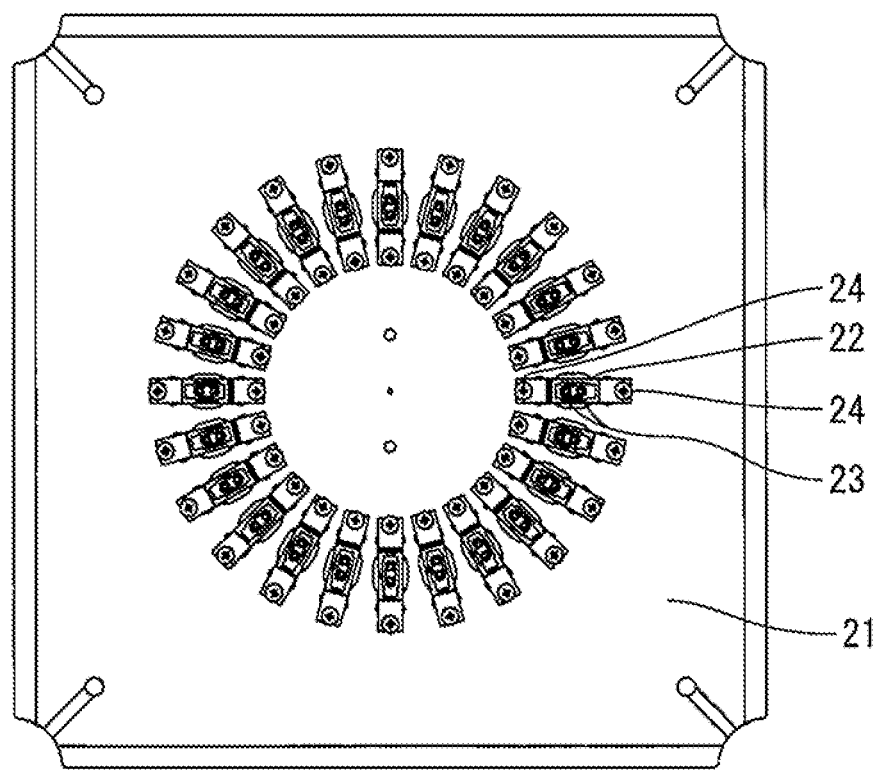
FIG. 2 is a plan view of the optical fiber ferrule polishing holder 20.
Figure 3:
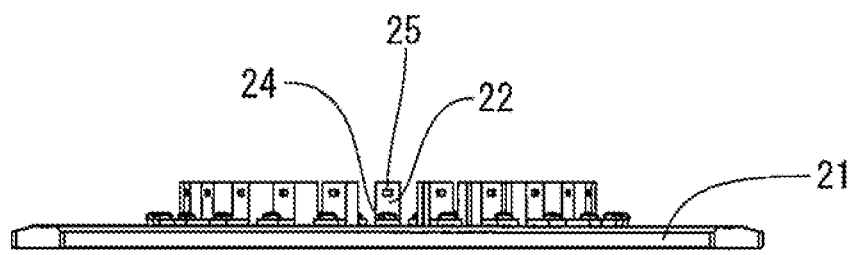
FIG. 3 is a front view of the optical fiber ferrule polishing holder 20.

FIG. 2 is a plan view of the holder 20. FIG. 3 is a front view of the holder 20. The holder 20 is formed by a holder body 21 and a plurality of adapters 22. The holder body 21 is formed in a plate shape having an approximately rectangular external shape in a plan view and having a predetermined thickness. Circular notches are provided on four corners of the holder body 21 so that the holder body 21 is not brought into contact with the shafts of the clamp levers 14 when the holder body 21 is placed on the polishing device 10. A plurality of insertion holes 23 is formed on the holder body 21 so that the ferrules 30 can be inserted into the insertion holes 23. Each of the insertion holes 23 is formed in a circular shape having an outer diameter slightly larger than an outer diameter of the ferrules 30 in a plan view. The insertion holes 23 penetrate through the holder body 21 in a plate thickness direction. The cross-sectional shape of each of the insertion holes 23 is an approximately rectangular shape. The insertion holes 23 are arranged on the holder body 21 at a constant interval in a circular shape around an approximately center of the holder body 21. Since the present embodiment is related to the holder 20 to which dual-core connectors are locked, two insertion holes 23 are arranged at a predetermined interval in a radial direction of the circular shape at each position in a circumferential direction of the circular shape.

The adapters 22 are arranged above the holder body 21 at each position in the circumferential direction of the circular shape so as to cover two insertion holes 23 arranged in the radial direction from above. Each of the adapters 22 is arranged to be directed in the radial direction of the circular shape in a plan view of the adapters 22. Each of the adapters 22 is fixed to the holder body 21 by screws 24 at near both ends of each of the adapters 22 in a longitudinal direction. A center part of each of the adapters 22 is protruded upward and formed in a cylindrical shape having a rectangular shape in a plan view. The connector 40 can be inserted into the above described cylindrical portion from above. A locking hole 25 is formed on the cylindrical portion of the adapter 22. As described later, a latch 42 of the connector 40 is locked to the locking hole 25. Thus, the connector 40 is locked to the adapters 22.

Figure 4:
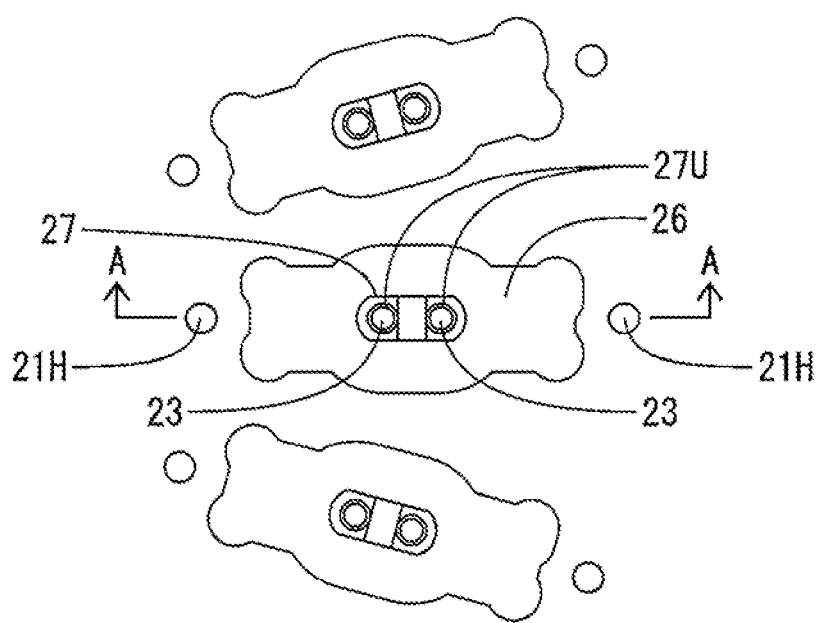
FIG. 4 is a plan view of a holder body 21 showing an enlarged state of a portion to which an adapter 22 is attached although the adapter 22 is detached in the drawing.
Figure 5:
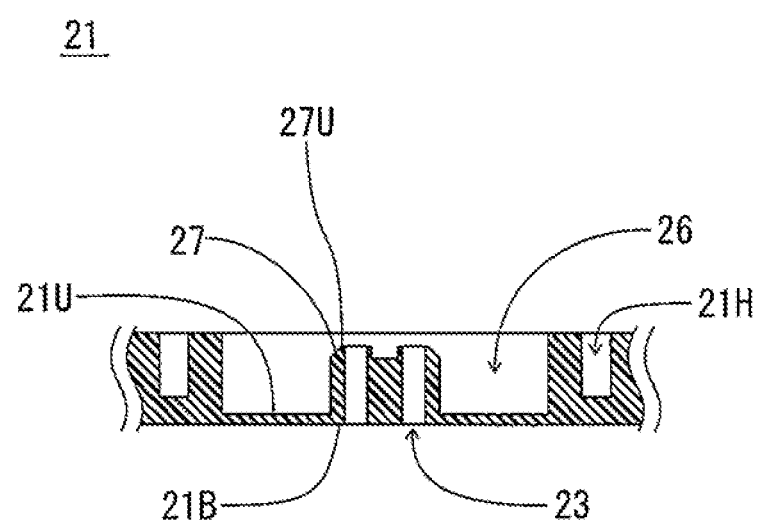
FIG. 5 is a cross-sectional view of the holder body 21 cut along an A-A line in FIG. 4.

FIG. 4 is a plan view of the holder body 21 showing an enlarged state of a portion to which the adapter 22 is attached although the adapter 22 is detached in the drawing. FIG. 5 is a cross-sectional view of the holder body 21 cut along an A-A line in FIG. 4. As shown in FIG. 4 and FIG. 5, the holder body 21 includes a recess 26 having a smaller thickness than the other portions at a periphery of two insertion holes 23 arranged in the radial direction of the circular shape. A protrusion 27 protruded upward is formed near the center of the recess 26. The protrusion 27 can be referred to as a protrusion protruded upward from an upper surface 21U (upper surface of recess 26) of the holder body 21. The protrusion 27 has a planar shape connecting two circular arcs by two straight lines as a whole. As shown in FIG. 4, an outer shape of the upper surface 27U of the protrusion 27 is formed in a circular shape having an outer diameter slightly larger than an outer diameter of the insertion holes 23. In addition, two screw holes 21H are formed on the holder body 21 at a position outside of both ends of the recess 26 in the longitudinal direction. As described later, the screws 24 for fixing the adapter 22 to the holder body 21 are inserted into the screw holes 21H.

Figure 6:
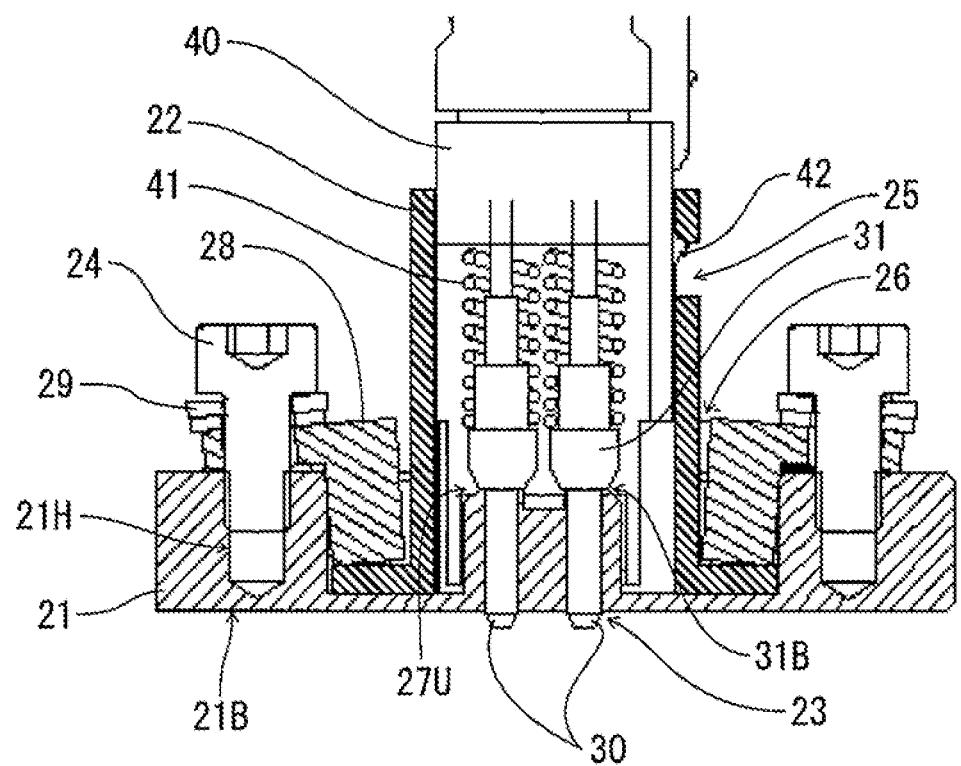
FIG. 6 is a cross-sectional view of the optical fiber ferrule polishing holder 20 to which the connector 40 is locked.

FIG. 6 is a cross-sectional view of the holder 20 to which the connector 40 is locked. The ferrules 30 are preliminarily incorporated in the connector 40 and located at the lower end of the connector 40. A flange 31 is provided on a periphery in the radial direction of each of the ferrules 30. The flange 31 is fitted to and fixed to the ferrule 30. A spring 41 is arranged above the flange 31. The spring 41 is housed in the connector 40 in a state that the spring 41 is preliminarily energized in a compression (contraction) direction. The ferrules 30 are energized below (toward the tip end) by an energizing force of the spring 41 via the flange 31.

The adapter 22 is housed in the recess 26 of the holder body 21 and fixed to the holder body 21 by the screws 24. A fixing member 28 having an L-shape in cross-section and a washer 29 are inserted between the adapter 22 and the screws 24. The fixing member 28 and the washer 29 are arranged on the adapters 22 and the screws 24 are inserted into the hole formed on the fixing member 28 and the hole formed on the washer 29. In this state, the screws 24 are screwed with the screw holes 21H of the holder body 21. Consequently, a lower surface of the fixing member 28 presses the adapter 22 downward and the adapter 22 is fixed to the holder body 21.

When the connector 40 is inserted into the cylindrical portion of the adapter 22 from above, the latch 42 of the connector 40 is elastically deformed and locked to the locking hole 25 provided on the adapter 22. Consequently, the connector 40 is locked to the adapter 22. At this time, the ferrules 30 located at the tip end of the connector 40 are inserted into the insertion holes 23 of the holder body 21 and the tip end of the ferrules 30 is protruded downward from a lower surface 21B of the holder body 21 by a predetermined protruded length. In order to polish a plurality of ferrules 30 evenly, it is important to make the protruded lengths of the ferrules 30 protruded from the lower surface 21B constant in a plurality of ferrules 30. The present invention provides the structure of preventing the displacement of the vertical position of the ferrules 30 with respect to the holder body 21 and suppressing the inclination of the axis of the ferrules 30 with respect to the axis of the insertion holes 23. In the holder 20 of the present invention, the thickness of the holder body 21 and the positions of the adapters 22 and the locking hole 25 are determined so that the upper surface 27U of the protrusion 27 of the holder body 21 is in contact with a lower surface 31B of the flange 31 of the ferrules 30 before the latch 42 is locked to the locking hole 25 when the connector 40 is locked to the adapter 22. Because of this, when the latch 42 is locked to the locking hole 25, the upper surface 27U of the protrusion 27 presses the ferrules 30 upward via the flanges 31. Thus, the springs 41 built in the connector 40 are compressed (contracted).

FIGS. 7A to 7C are cross-sectional views schematically showing the configuration of pressing the ferrules 30 by the upper surface 27U of the protrusion 27. For simplifying the explanation, the illustration of the members attached to the connector 40 is omitted except for the ferrules 30, the flanges 31 and the springs 41 in FIGS. 7A to 7C. The configuration of compressing the springs 41 will be explained using FIG. 7. As shown in FIG. 7A, when the connector 40 is inserted into the adapter 22, the ferrules 30 located at the tip end of the connector 40 are inserted into the insertion holes 23. As shown in FIG. 7B, when the connector 40 is further inserted below, the upper surface 27U of the protrusion 27 of the holder body 21 is in contact with the lower surfaces 31B of the flanges 31 (of the ferrules 30) at a peripheral position of the insertion holes 23. At this time, the latch 42 is not locked to the locking hole 25. When the connectors 40 is further pressed downward from the above described state, as shown in FIG. 7C, the upper surface 27U of the protrusion 27 presses the ferrules 30 upward via the flanges 31. Consequently, the springs 41 built in the connector 40 are compressed to a length L2, which is shorter than an initial length L1 (L1>L2), and the latch 42 is locked to the locking hole 25 in a state that the springs 41 are compressed. In other words, when the connector 40 is locked to the adapter 22, the upper surface 27U (upper surface of the holder body 21) of the protrusion 27 presses the optical fiber ferrule 30 by the peripheral position of the insertion holes 23. Thus, the springs 41 built in the connector 40 are compressed. Since the present embodiment is related to the dual-core connector, two insertion holes 23 are formed at two positions of the holder body 21 in accordance with the interval of two ferrules 30, the upper surface 27U of the protrusion 27 presses the ferrules 30 at two positions of the peripheral position of the insertion hole. Thus, the springs 41 respectively built in two ferrules 30 are compressed. In case of the multicore connector having three or more cores, the insertion holes 23 are formed at a plurality of positions of the holder body 21, the upper surface 27U of the protrusion 27 presses the ferrules 30 at the plurality of positions of the peripheral position of the insertion hole. Thus, the springs 41 respectively built in the plurality of ferrules 30 are compressed. Note that the length of compression of the spring 41 (L1-L2) is preferably 0.1 to 0.3 mm or less.

As described above, since the upper surface 27U of the protrusion 27 presses the ferrules 30, the springs 41 are further compressed compared to the initial state. Thus, the springs 41 give energizing force to the ferrules 30. Since the lower surface 31B of the flange 31 is in contact with the upper surface 27U of the protrusion 27, the ferrules 30 are pressed toward the upper surface 27U of the protrusion 27 by the energizing force of the springs 41. Consequently, the ferrules 30 can be tightly fixed to the holder body 21 without forming a clearance. Here, a polishing load for pressing the ferrules 30 to the polishing film 12 (polishing pad 11) when polishing the ferrules 30 is approximately 100 g (grams) per one ferrule, for example. The spring load of the spring 41 built in the connector 40 is approximately 400 g (grams), for example. Thus, the spring load of the springs 41 is relatively large compared to the above described polishing load. Therefore, even when the polishing load is applied to the ferrules 30, the springs 41 are not further compressed. Accordingly, even when the ferrules 30 are polished, the upper surface 27U of the protrusion 27 is in contact with the ferrules 30 without a clearance. Thus, the state of pressing the ferrules 30 by the upper surface 27U is maintained. Namely, the height position of the tip end of the ferrules 30 is maintained constant between the state of not performing the polishing and the state of performing the polishing. In the present embodiment, the flanges 31 correspond to the abutting portion provided on the periphery in the radial direction of the optical fiber ferrule.

Figure 8:
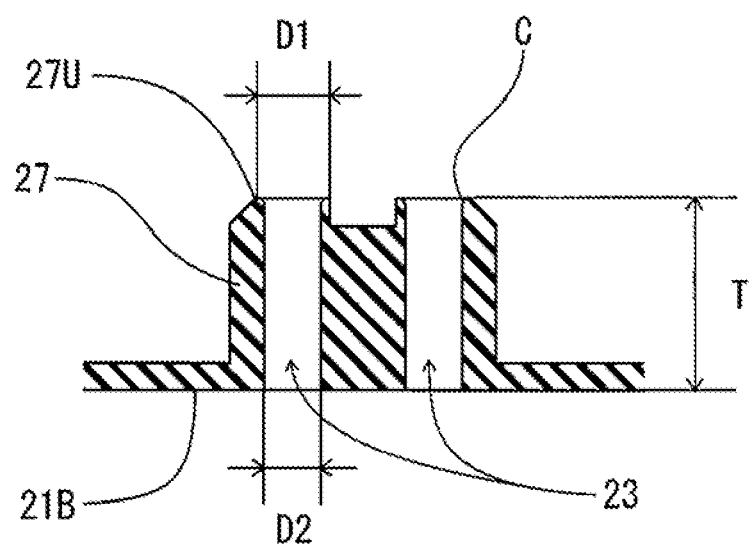
FIG. 8 is a cross-sectional view showing an enlarged state of a periphery of an insertion hole 23 of the holder body 21.

FIG. 8 is a cross-sectional view showing an enlarged state of a periphery of the insertion hole 23 of the holder body 21. The shape of the holder body 21 will be explained in detail using FIG. 8. The thickness of the holder body 21 from the lower surface 21B of the holder body 21 to the upper surface 27U (an upper surface of the holder body 21 at the peripheral position of the insertion holes 23) of the protrusion 27 is a predetermined thickness T. The predetermined thickness T is preferably in the range of 3.8 mm to 4.4 mm. Since the predetermined thickness T is specified in the above described range, it is achieved that the upper surface 27U of the protrusion 27 of the holder body 21 contacts (abuts) the lower surface 31B of the flanges 31 of (the ferrules 30) before the latch 42 is locked to the locking hole 25. Since the above described configuration is adopted, even when the connecter having the structure of housing the flanges 31 of the ferrules 30 inside the connector 40 is used and the flanges 31 cannot be seen from the outside as shown in the present embodiment, the upper surface 27U of the protrusion 27 can press the lower surface 31B of the flanges 31. Since the present embodiment is related to the dual-core connector, the insertion holes 23 are formed at two positions of the holder body 21 in accordance with the interval of two ferrules 30 and the predetermined thickness is same in the two positions. When the multicore connector having three or more cores, the insertion holes 23 are formed at a plurality of positions of the holder body 21 and the predetermined thickness T is same in the plurality of positions. Since the above described configuration is adopted, even when the insertion holes 23 are formed at a plurality of positions in the dual core connector or the multicore connector having three or more cores, the protruded length of the ferrules 30 protruded from the lower surface 21B of the holder body 21 can be constant.

An upper end of the insertion hole 23 is chamfered (chamfer C) by 0.05 mm or more. Because of this, an area of the upper surface 27U of the protrusion 27 can be optimized. Thus, the structure capable of easily transferring the upward force from the upper surface 27U of the protrusion 27 to the lower surface 31B of the flanges 31 at the peripheral position of the insertion holes 23 is realized. An outer shape of the upper surface 27U of the protrusion 27 is formed in a circular shape having a predetermined outer diameter D1. The predetermined outer diameter D1 is preferably within the range of 1.4 mm to 2.5 mm. Since the predetermined outer diameter D1 is specified in the above described range, the structure capable of easily transferring the upward force from the upper surface 27U of the protrusion 27 to the lower surface 31B of the flanges 31 at the peripheral position of the insertion holes 23 is realized. In the present embodiment, since an outer diameter D2 of the ferrules 30 is generally 1.25 mm, it can be said that a ratio (D1/D2) of the outer diameter D1 with respect to the outer diameter D2 of the ferrules 30 is within the range of 1.12 to 2.00. It is considered that the above described ratio (D1/D2) is also effective when using the ferrules having other outer diameters.

As explained above, the holder 20 of the present invention is configured to abut on the lower surface 31B of the flanges 31 (of the ferrules 30) by the upper surface 27U of the protrusion 27 of the holder 20 when the connector 40 is attached to the adapter 22. Because of this, the upper surface 27U of the protrusion 27 presses the lower surface 31B of the flange 31 of the ferrules 30 upward. Thus, the springs 41 built in the connector 40 are compressed. As a result, the ferrules 30 are pressed toward the holder body 21 by the energizing force of the springs 41. Thus, the displacement of the vertical position of the ferrules 30 with respect to the holder body 21 and the inclination of the axis of the ferrules 30 with respect to the insertion holes 23 can be suppressed. Consequently, the difference of the protruded lengths of the ferrules 30 protruded from the lower surface 21B of the holder body 21 and the difference of the angles of the ferrules 30 can be suppressed. Since the ferrules 30 are pressed toward the holder body 21 by the energizing force of the springs 41, even when the force is applied to the cable connected to the ferrules 30, the ferrules 30 can be prevented from being displaced. In the dual-core connector and the multicore connector having three or more cores, the protruded length and the angle are easily displaced in a plurality of ferrules 30 incorporated in one connector when the connectors 40 are inclined from the parallel state with respect to the holder 20. Thus, the effect of the present invention is particularly remarkable for the dual-core connector and the multicore connector. When a plurality of connectors 40 is arranged in a circular shape on the holder 20, the difference of the polishing caused by the displacement of the angle of the ferrules 30 hardly occurs. Thus, the effect of the present invention is particularly remarkable for the connectors 40 arranged in a circular shape. Since the present invention uses the energizing force of the springs 41 preliminarily built in the connectors 40, the above described effect can be obtained without adopting the complicated structure in the adapter 22. In the conventional polishing holder, the position of the ferrule depends on the position of the connector. Therefore, when the bending force is added to the cable, the connector is inclined and the influence is transferred to the ferrules. Thus, the protruded amount of the ferrules protruded from the polishing holder varies. This affects the shape of the end surface of the ferrules. In particular, Radius is affected. In the present invention, the ferrules are abutted on the holder body of the polishing holder. Thus, the position of the ferrule depends on the holder body of the polishing holder without depending on the connector. Accordingly, even when the bending force is added to the cable and the connector is inclined, the ferrules are not influenced by that. Thus, the shape of the end surface of the ferrules can be stably obtained.

Figure 9:
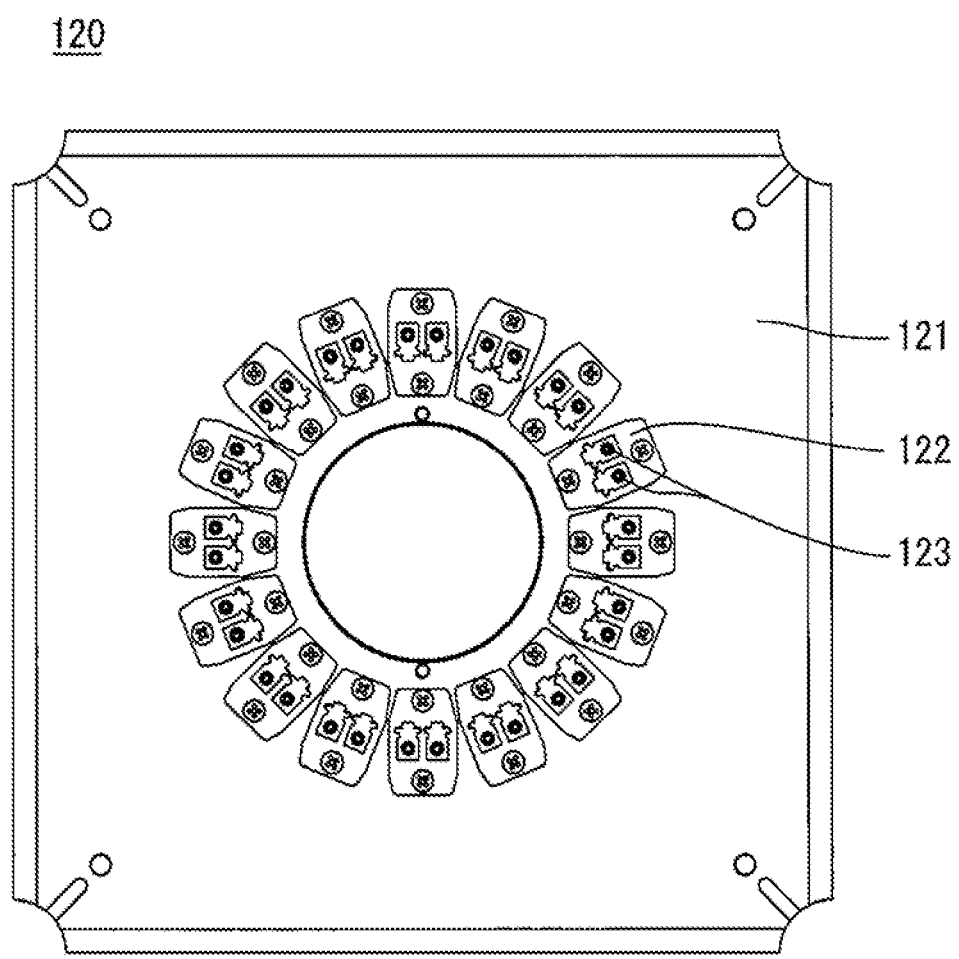
FIG. 9 is a plan view of an optical fiber ferrule polishing holder 120.
Figure 10:
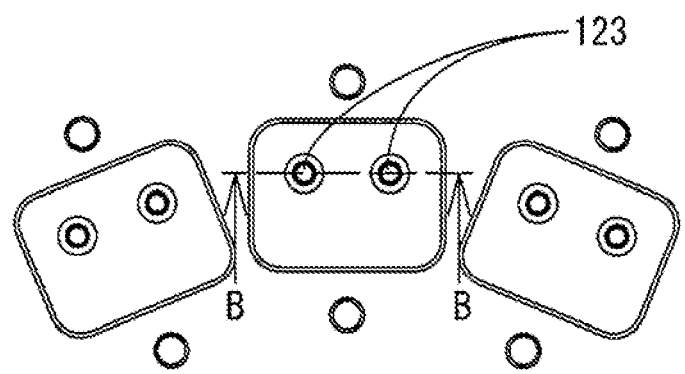
FIG. 10 is a plan view of a holder body 121 showing an enlarged state of a portion to which an adapter 122 is attached although the adapter 122 is detached in the drawing.
Figure 11:
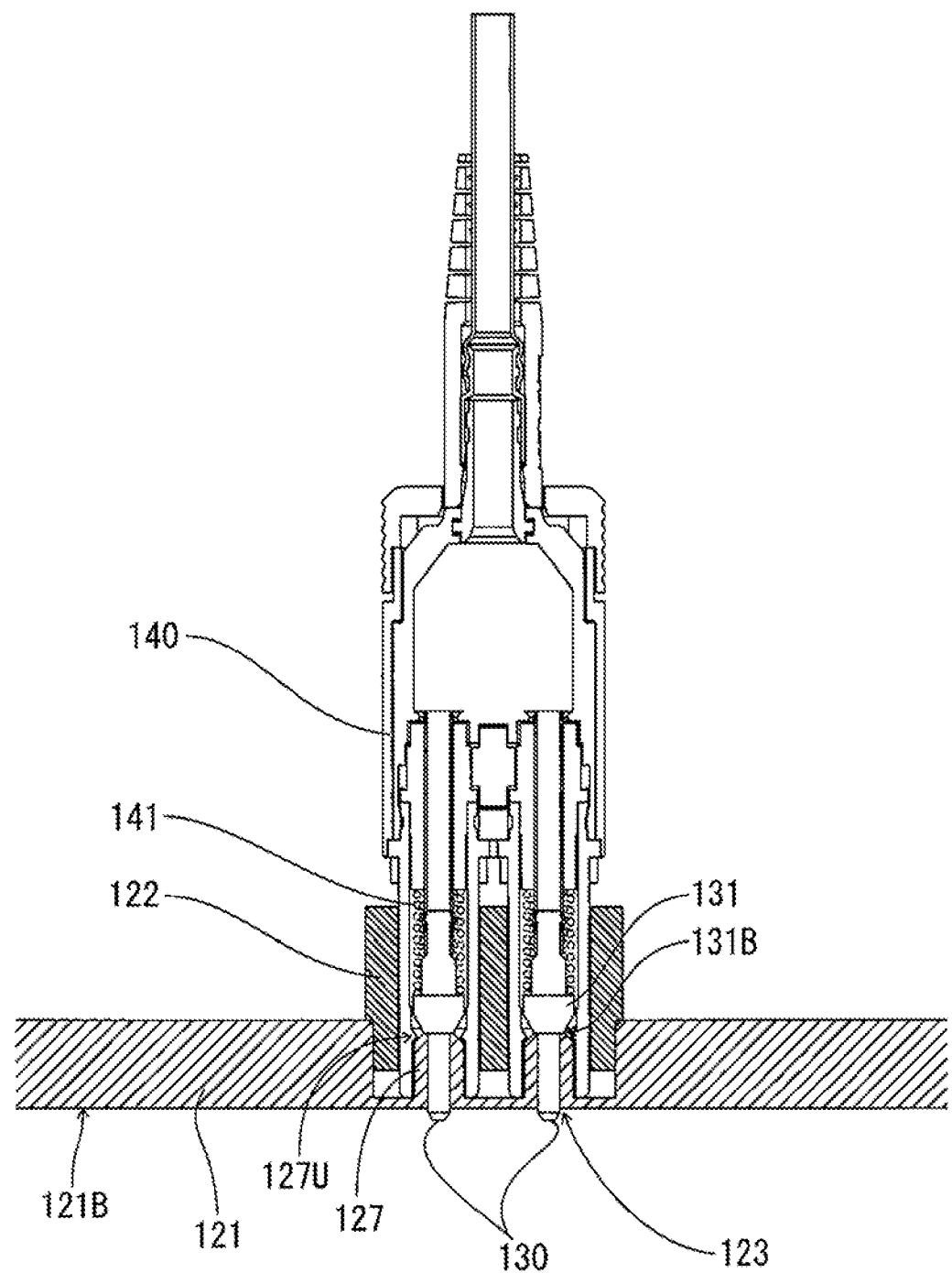
FIG. 11 is a cross-sectional view showing a state that a connector 140 is locked to the optical fiber ferrule polishing holder 120 and cut along a B-B line in FIG. 10.

FIG. 9 is a plan view of an optical fiber ferrule polishing holder 120 (hereafter, holder 120) as another embodiment. FIG. 10 is a plan view of a holder body 121 showing an enlarged state of a portion to which an adapter 122 is attached although the adapter 122 is detached in the drawing. FIG. 11 is a cross-sectional view showing a state that a connector 140 is locked to the holder 120 and cut along a B-B line in FIG. 10. The connector 140 is an LC connector (dual-core). The basic structure of the holder 120 is same as that of the holder 20. However, the holder 120 is different from the holder 20 in the point that insertion holes 123 are arranged two by two at a predetermined interval in the circumferential direction of the circular shape. In addition, the shape of the adapter 122 and the structure of attaching the adapter 122 to the holder body 121 are different, for example. The connector 140 is locked to the adapter 122 by inserting the connector 140 into the adapter 122 from above. At this time, ferrules 130 located at the tip end of the connector 140 are inserted into the insertion holes 123 of the holder body 121 and the tip end of the ferrules 130 is protruded downward from a lower surface 121B of the holder body 121 by a predetermined protruded length. When the connector 140 is locked to the adapter 122, an upper surface 127U of a protrusion 127 of the holder body 121 is in contact with a lower surface 131B of a flange 131 of the ferrules 130. Because of this, when the connector 140 is locked to the adapter 122, the upper surface 127U of the protrusion 127 presses the ferrules 130 upward via the flange 131. Thus, springs 141 built in the connector 140 are compressed.

Figure 12:
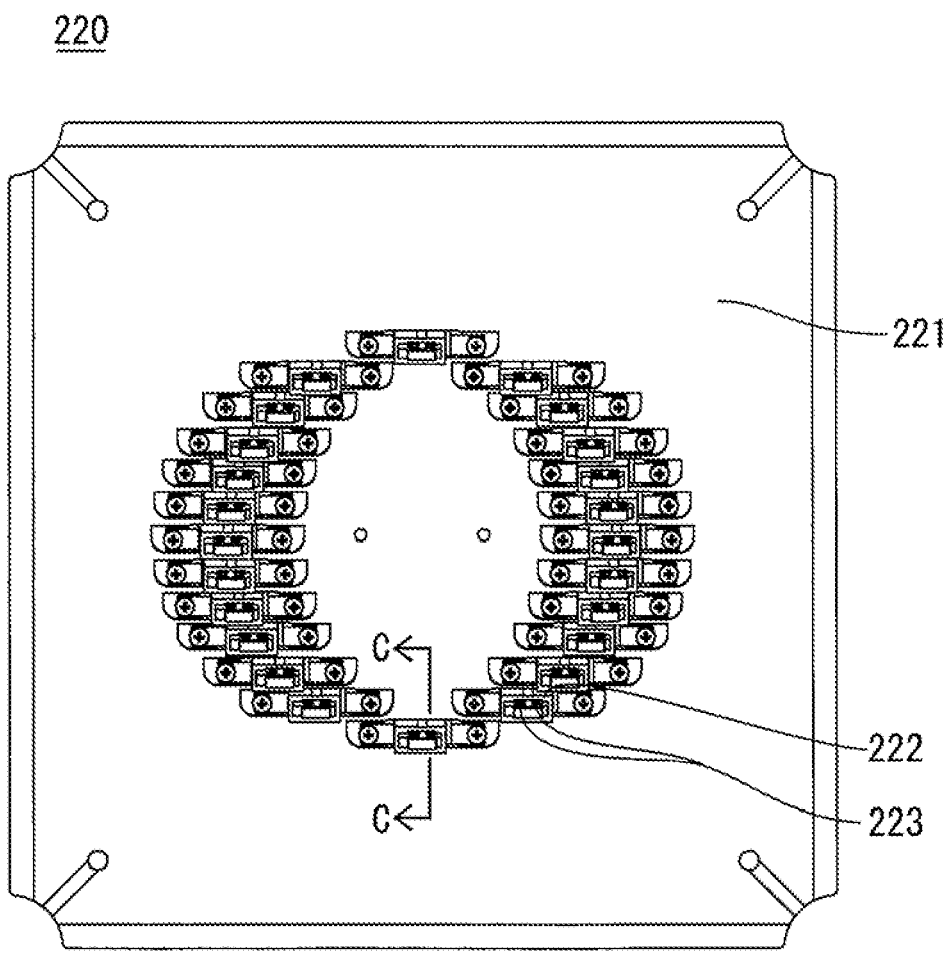
FIG. 12 is a plan view of an optical fiber ferrule polishing holder 220.
Figure 13:
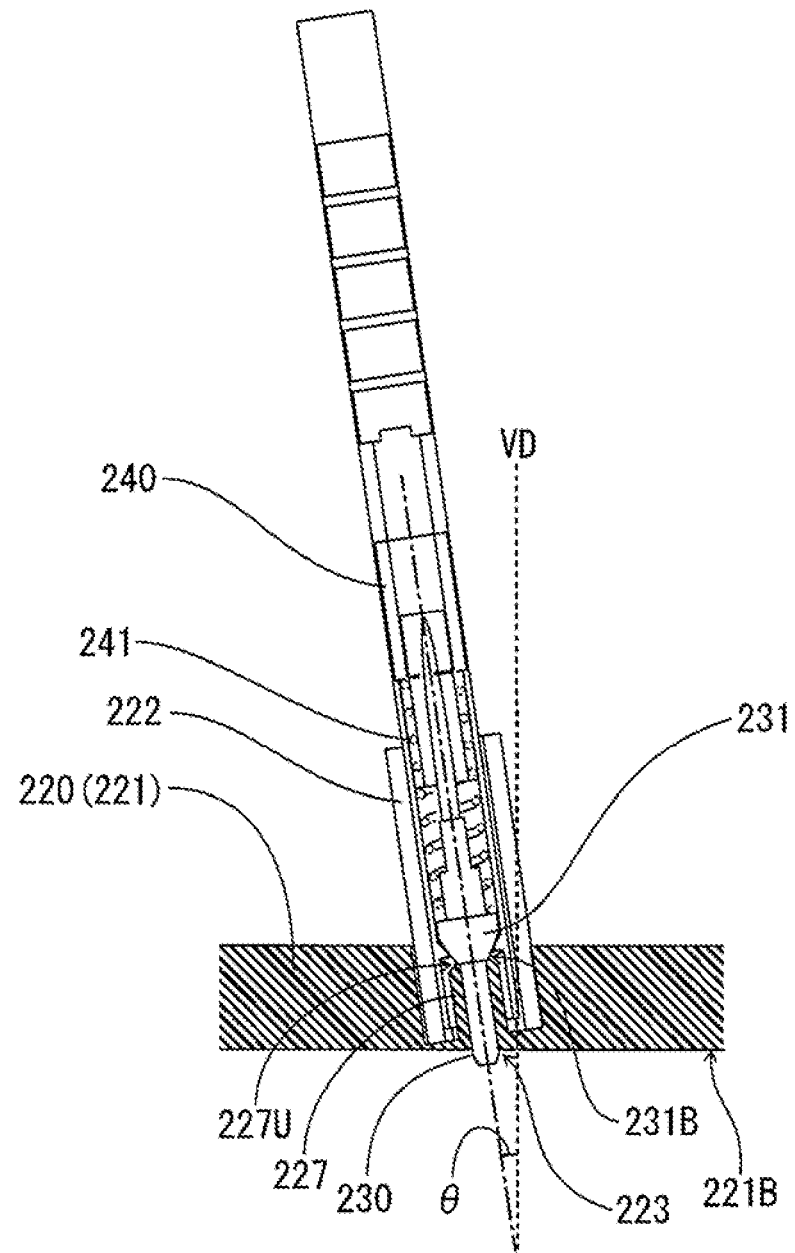
FIG. 13 is a cross-sectional view showing a state that a connector 240 is locked to the optical fiber ferrule polishing holder 220 and cut along a C-C line in FIG. 12.

FIG. 12 is a plan view of an optical fiber ferrule polishing holder 220 (hereafter, holder 220) as another embodiment. FIG. 13 is a cross-sectional view showing a state that a connector 240 is locked to the holder 220 and cut along a C-C line in FIG. 12. The connector 240 is a connector used for APC (Angled Physical Contact) polishing where an end face of an optical fiber ferrule 230 (hereafter, ferrule 230) is obliquely polished. The basic structure of the holder 220 is same as that of the holder 20. However, the holder 220 is different from the holder 20 in the point that the directions of the connectors 240 to which a plurality of adapters 222 are attached are arranged (aligned) in the same direction. In addition, the center line of the insertion hole 223 is inclined by a predetermined angle θ with respect to a vertical direction VD (direction orthogonal to the polishing surface). The predetermined angle θ is specified to approximately 8°. Furthermore, an upper surface 227U of a protrusion 227 of a holder body 221 is orthogonal to the axial direction of the insertion hole 223. Namely, the holder body 221 is orthogonal to the axial direction of the insertion hole 223 at the peripheral position of the insertion hole. It can be also said that the upper surface 227U (the upper surface of the holder body 221) of the protrusion 227 is inclined by the predetermined angle θ with respect to the polishing surface. By adopting the above described configuration, the upper surface 227U (the upper surface of the holder body 221) of the protrusion 227 contacts a lower surface 231B of flanges 231 even in the APC polishing. Thus, the upper surface 227U (the upper surface of the holder body 221) of the protrusion 227 presses the ferrules 230 along the axial direction and springs 241 can be compressed. In the APC polishing, the difference of the protruded lengths of the ferrules 230 protruded from a lower surface 221B of the holder 220 and the difference of the angles significantly affect the polishing performance. Thus, the effect of using the holder 220 of the present invention is particularly remarkable in the APC polishing.

Figure 14:
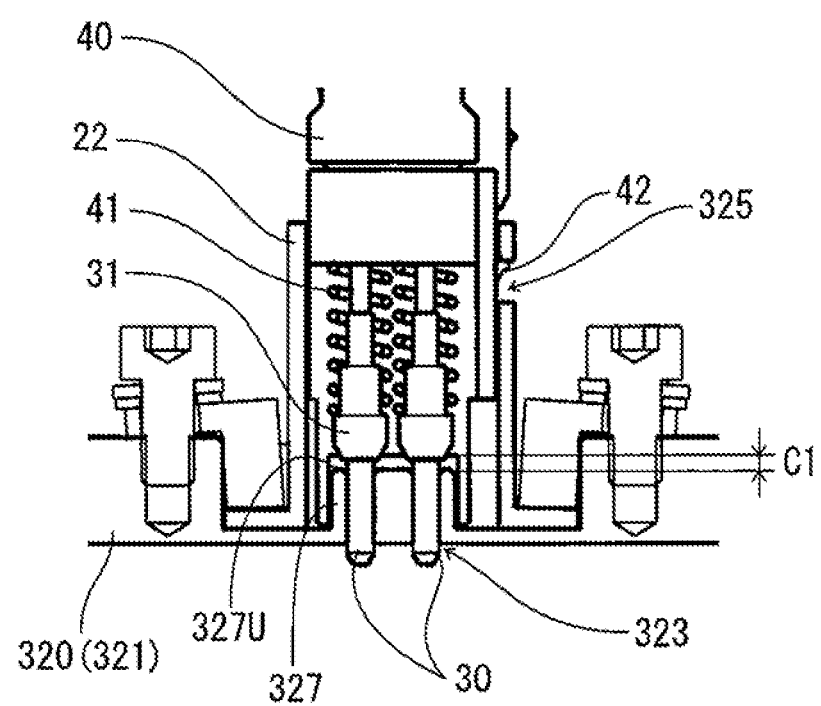
FIG. 14 is a cross-sectional view showing a state that the connector 40 is locked to the holder in an optical fiber ferrule polishing holder 320 of the conventional technology.

FIG. 14 is a cross-sectional view showing a state that the connector 40 is locked to the holder in an optical fiber ferrule polishing holder 320 (hereafter, holder 320) of the conventional technology as a comparative example 1. Although FIG. 14 is the cross-sectional view, the hatching is omitted. As shown in FIG. 14, in the holder 320 of the conventional technology, when the latch 42 is locked to a locking hole 325 of the adapter 22, an upper surface 327U of a protrusion 327 of a holder body 321 is not in contact with the flanges 31 of the ferrules 30 at the peripheral position of an insertion hole 323. A clearance C1 is formed between the upper surface 327U of the protrusion 327 of the holder body 321 and the flanges 31. Since the clearance C1 exists, there is a possibility that the ferrules 30 are moved relatively to the holder 320. In addition, the upper surface 327U of the holder body 321 does not press the ferrules 30 upward, and the upper surface 327U of the holder body 321 does not compress the springs 41 built in the connectors 40.

Figure 15:
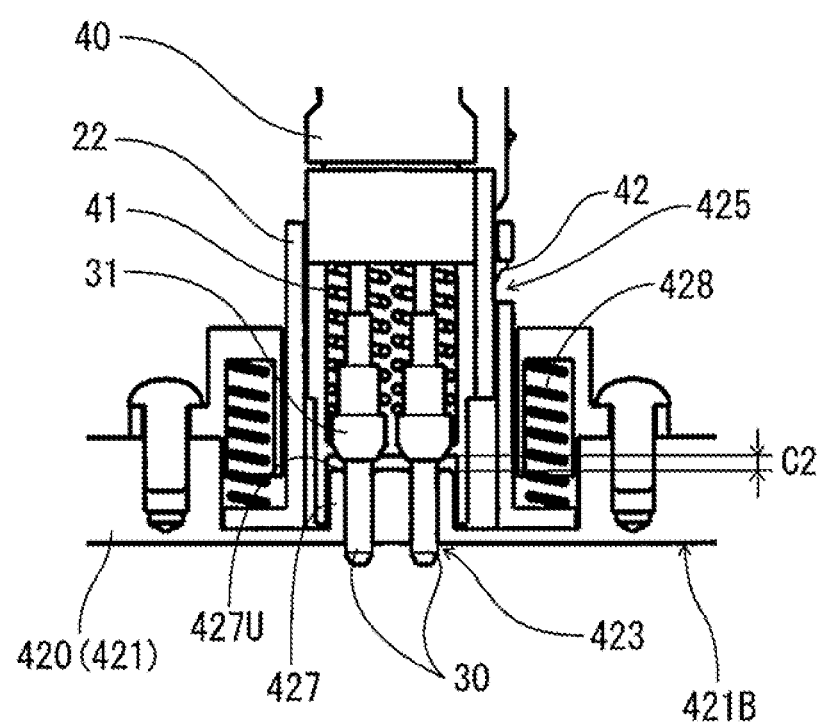
FIG. 15 is a cross-sectional view showing a state that the connector 40 is locked to the holder in an optical fiber ferrule polishing holder 420 of the conventional technology.

FIG. 15 is a cross-sectional view showing a state that the connector 40 is locked to the holder in an optical fiber ferrule polishing holder 420 (hereafter, 420) of the conventional technology as a comparative example 2. Although FIG. 15 is the cross-sectional view, the hatching is omitted. The holder 420 is called as IPC (Independent Pressure Control) where springs 428 are provided inside the holder 420. Even when the protruded lengths of the ferrules 30 protruded from a lower surface 421B of a holder body 421 are not constant, the difference of the protruded lengths of the ferrules 30 can be reduced by the operation of the springs 428 when the ferrules 30 are pressed to the polishing surface. Similar to the holder 320, in the holder 420, when the latch 42 is locked to a locking hole 425 of the adapter 22, an upper surface 427U of a protrusion 427 of the holder body 421 is not in contact with the flanges 31 of the ferrules 30 at the peripheral position of an insertion hole 423. A clearance C2 is formed between the upper surface 427U of the protrusion 427 of the holder body 421 and the flanges 31. Since the clearance C2 exists, there is a possibility that the ferrules 30 are moved relatively to the holder 420. In addition, the upper surface 427U of the holder body 421 does not press the ferrules 30 upward, and the upper surface 427U of the holder body 421 does not compress the springs 41 built in the connectors 40.

Figure 16:
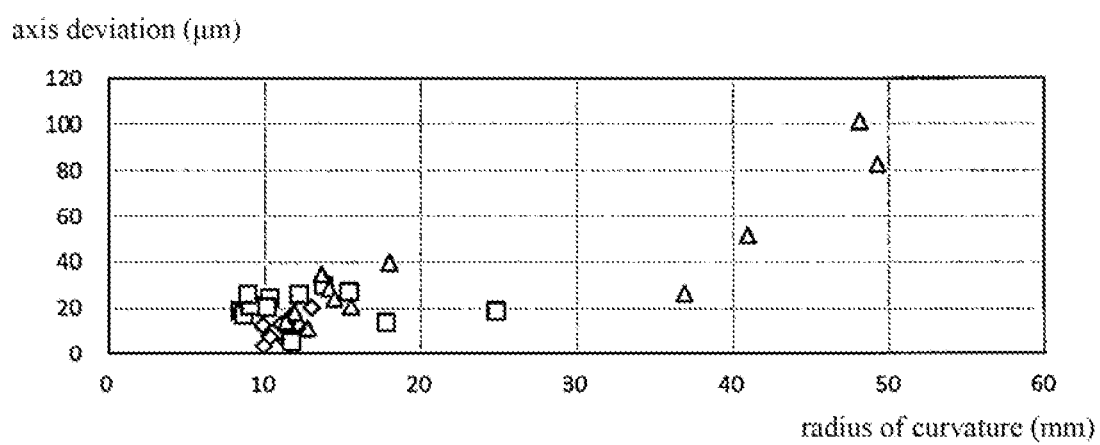
FIG. 16 is a graph showing an experimental result for confirming an effect of the present invention.

FIG. 16 is a graph showing an experimental result for confirming an effect of the present invention. The connectors 40 were attached to each of the holders and polished. Then, the radius of curvature of the end face of the ferrules 30 and the axis deviation of the center of the radius of curvature with respect to the center of the optical fiber were compared using the holder 20 of the present invention and the holders 320, 420 of the comparative examples. PC (Physical Contact) polishing was used as a method of polishing and 12 samples of the ferrules 30 were compared for each of the holders. In FIG. 16, the measurement result of the holder 20 of the present invention is shown by rhombus, the measurement result of the holder 320 of the comparative example 1 is shown by quadrate, and the measurement result of the holder 420 of the comparative example 2 is shown by triangle. As shown in FIG. 16, when the holder 20 of the present invention was used, both the radius of curvature and the axis deviation were suppressed within the standard. It is understood that the difference is smaller compared to the holders 320, 420. Namely, it is confirmed that the holder 20 of the present invention remarkably has the effect of polishing the ferrules 30 evenly.

In the above described embodiment, the upper surface 27U of the protrusion 27 contacts the lower surface 31B of the flange 31 and presses the ferrules 30 upward. However, the structure of the holder 20 of the present invention is not limited to the above described structure. Various structures can be adopted as long as the upper surface of the holder body 21 presses the ferrules 30 at the peripheral position of the insertion holes 23. For example, the present invention can be applied even when the holder body 21 does not have the recess 26 and the protrusion 27 and the upper surface of the holder body 21 is flat by adopting the structure where the ferrules 30 is pressed by the upper surface of the holder body 21 at the peripheral position of the insertion holes 23. Note that the peripheral position of the insertion holes 23 means a portion having a certain area extended outward from a periphery of the insertion hole 23.

In the above described embodiment, the explanation was made by using the flange 31 as an example of the abutting portion on which the upper surface 27U of the protrusion 27 is abutted. However, the abutting portion is not limited to the flange 31. The abutting portion can be any member as long as the abutting portion is fixed to the ferrule 30 and vertically moved interlockingly with the ferrules 30. In addition, the means for pressing the ferrules 30 upward is not necessarily limited to the abutting portion as long as any other structure can press the ferrules 30 upward. The structure of pressing the ferrules 30 upward by other structure than the abutting portion is also included in the present invention.

In the above described embodiment, the upper surface 27U of the protrusion 27 has an outer shape of having two circular shapes. However, the number of the circular shapes is preferably changed depending on the number of the ferrules 30 incorporated in one connector 40. For example, in case of the single-core connector, the upper surface 27U of the protrusion 27 preferably has one circular shape. In case of the multicore connector having three or more cores, the upper surface 27U of the protrusion 27 preferably has three or more circular shapes. Note that the circular shape here does not mean that the outer shape of the upper surface 27U is a circular shape strictly. Even when recess, projection and linear portion can be seen in a part of the circular arc, the outer shape can be a circular shape in the present invention as long as the outer shape has an approximately circular shape as a whole. In addition, the outer shape of the upper surface 27U can be other shapes than the circular shape as long as the upper surface 27U can press the ferrules 30.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS

10: optical fiber ferrule polishing device, 11: polishing pad, 12: polishing film, 13: holding base, 14: clamp lever, 20, 120, 220: optical fiber ferrule polishing holder, 21, 121, 221: holder body, 22, 122, 222: adapter, 23, 123, 223: insertion hole, 24: screw, 25: locking hole, 26: recess, 27, 127, 227: protrusion, 28: fixing member, 29: washer, 30, 130, 230: optical fiber ferrule, 31, 131, 231: flange, 40, 140, 240: connector, 41, 141, 241: spring, 42: latch

What is claimed is:

1. An optical fiber ferrule polishing holder for holding a plurality of optical fiber ferrules incorporated in a connector at a plurality of positions, the optical fiber ferrule polishing holder comprising:

a holder body having a plate shape; and an adapter fixed to the holder body so that the connector can be locked to the adapter, wherein the holder body includes an insertion hole into which each of the plurality of optical fiber ferrules can be inserted, when the connector is locked to the adapter, an upper surface of the holder body presses the plurality of optical fiber ferrules at a peripheral position of the insertion hole of the plurality of positions to contract a spring built in the connector for each of the plurality of optical fiber ferrules, and a thickness of the holder body from a lower surface of the holder body to the upper surface of the holder body is same in the plurality of positions.

2. The optical fiber ferrule polishing holder according to claim 1, wherein when the connector is locked to the adapter, the upper surface of the holder body contacts an abutting portion provided on a periphery in a radial direction of each of the plurality of optical fiber ferrules at the peripheral position of the insertion hole of the plurality of positions and presses the plurality of optical fiber ferrules to contract the spring built in the connector.

3. The optical fiber ferrule polishing holder according to claim 2, wherein the abutting portion is a flange provided on the periphery in the radial direction of each of the plurality of optical fiber ferrules.

4. The optical fiber ferrule polishing holder according to claim 1, wherein the holder body includes a protrusion protruded upward from the upper surface of the holder body at the peripheral position of the insertion hole of the plurality of positions, and the upper surface of the protrusion is configured to press the plurality of optical fiber ferrules for compressing the spring built in the connector.

5. The optical fiber ferrule polishing holder according to claim 1, wherein a thickness of the holder body from a lower surface of the holder body to the upper surface of the holder body at the peripheral position of the insertion hole is 3.8 mm to 4.4 mm.

6. The optical fiber ferrule polishing holder according to claim 1, wherein an upper end of the insertion hole is chamfered by 0.05 mm or more.

7. The optical fiber ferrule polishing holder according to claim 4, wherein an outer shape of the upper surface of the protrusion includes a circular shape, and an outer diameter of the circular shape is 1.4 mm to 2.5 mm.

8. The optical fiber ferrule polishing holder according to claim 4, wherein an outer shape of the upper surface of the protrusion includes a circular shape, and a ratio of the outer diameter of the circular shape with respect to the outer diameter of each of the plurality of optical fiber ferrules is 1.12 to 2.00.

9. The optical fiber ferrule polishing holder according to claim 1, wherein
the insertion hole includes a plurality insertion holes, and
the plurality of insertion holes is arranged in a circular shape on the holder body.

10. The optical fiber ferrule polishing holder according to claim 1, wherein
the insertion hole is inclined by a predetermined angle with respect to a vertical direction, and
the upper surface of the holder body is orthogonal to an axial direction of the insertion hole at the peripheral position of the insertion hole.

11. An optical fiber ferrule polishing device having the optical fiber ferrule polishing holder according to claim 1.

12. An optical fiber ferrule polishing holder for holding two optical fiber ferrules incorporated in a connector at two positions, the optical fiber ferrule polishing holder comprising:
a holder body having a plate shape; and
an adapter fixed to the holder body so that the connector can be locked to the adapter, wherein
the holder body includes an insertion hole into which each of the two optical fiber ferrules can be inserted,
when the connector is locked to the adapter, an upper surface of the holder body presses the two optical fiber ferrules at a peripheral position of the insertion hole of the two positions to contract a spring built in the connector for each of the two optical fiber ferrules, and
a thickness of the holder body from a lower surface of the holder body to the upper surface of the holder body is same in the two positions.

* * * * *